Jan. 16, 1962    C. A. RODMAN    3,017,239
AIR CONDITIONER FILTERS HAVING GERMICIDAL PROPERTIES
Filed Nov. 3, 1958    2 Sheets-Sheet 1

INVENTOR.
CLARKE A. RODMAN
BY
*Charles C. Willson*
ATTORNEY

3,017,239
AIR CONDITIONER FILTERS HAVING GERMICIDAL PROPERTIES

Clarke A. Rodman, Barrington, R.I., assignor to Fram Corporation, Providence, R.I., a corporation of Rhode Island
Filed Nov. 3, 1958, Ser. No. 771,421
5 Claims. (Cl. 21—58)

This invention relates to filters for air conditioner units, these filters being chemically treated to prevent the growth of bacteria and fungus thereon for long periods of time. The present application is a continuation-in-part of my application Serial No. 694,083, filed November 4, 1957, now abandoned.

Air conditioner units are extensively used to filter both cold and warm air supplied to the interior of houses, offices and other buildings. Where such units are used in hot, moist climates, much difficulty is experienced due to the growth of fungus and bacteria on the filter. It is not unusual for fungus growth to form on filters to such an extent that it completely blocks the passage of air therethrough, thereby lowering the efficiency of an air conditioner unit. Attempts have been made heretofore to remedy this condition, but they have been only partially successful.

The present invention contemplates greatly improved filter media for air conditioner units and methods of preparing filter media which possess excellent germicide and fungicide properties and will retain these properties for months of filter use. More specifically, the present invention contemplates a filter of this type that has imparted thereto germicidal and fungicidal properties of a permanent nature and is effective to prevent growth of bacteria and fungi on the filter and to render sterile the germs and fungi removed from the air stream by the filter.

The filter media for use in air conditioner units should be designed to be in service for two to six months or more before being replaced. During such period, millions of cubic feet of air pass through the medium. The bactericidal and fungicidal agent for use in the treatment herein contemplated is non-volatile and therefore will not be removed from the filter medium by the moving air stream.

The bactericidal and fungicidal chemicals used in treating the filter medium, as herein contemplated, are preferably colorless, approximately odorless and are substantially non-vaporizable throughout the range of atmospheric temperatures, and temperatures of air used for heating or cooling, so that air passing through a treated filter is non-toxic to persons or animals. The pH of the agent applied to the filter medium is substantially neutral so that there are no objectionable acid or alkali effects. Also, the chemicals used in imparting these desired properties to filter media can be made up in a stable water dispersion and can be sprayed on the filter media to render them lethal to bacteria and fungi and to form a permanent deposit on the filter fibers which cannot be leached off by water, or removed by air, or mixtures of water and air.

A filter medium used to filter either hot or cold air that passes through an air conditioner unit, or ventilating unit or fan, or blower unit, may be variously constructed but preferably is given the form of an unwoven fibrous sheet, such as a batt or panel, of a size and shape to be readily inserted in and removed from the air conditioner unit so that replacement of the filter can be readily accomplished.

If the filter medium is formed of random disposed fibers, as is preferably the case, various types of fibers may be used, such as cotton, wool or other natural fibers, or synthetic fibers, such for example as cellulose acetate or viscose fibers. Acetate and viscose fibers are found very satisfactory, as they are comparatively inexpensive and have low water-retaining properties. Also, acetate fibers are less flammable than many other fibers; and viscose fibers can be easily made fire resistant. These acetate and viscose fibers are preferably crimped so that they will interlock well in the batt or other filter media constructions and impart loft to the batt.

If an air conditioner filter is to do a good job of freeing the air passing therethrough of dust and other foreign particles down to a few microns in size, it is important that the filter material be formed of an intermixture of coarse and fine fibers, as the fine fibers are needed to stop the fine dirt particles and the coarse fibers are needed to keep the fine fibers in an open, unmatted condition. For best results, it is considered desirable to use a mixed fiber structure employing (a) coarse fibers to maintain an open structure, (b) medium fibers to balance the blend and to support without clumping a network of fine fibers, and (c) fine fibers to present a large fiber surface area for impaction filtration.

It is well known that when air is forced through a filter of loose fibers, the air tends to shift the fibers and form channels through the filter medium. To prevent this, the fibrous mass may be sprayed with a bonding agent that will secure one fiber to another at their crossing point and thereby retain the fibers in place, or if thermoplastic fibers are employed, they can be bonded by heating, plasticization or salt fusion, or low melting thermoplastic fibers can be used to bond higher melting or other non-melting fibers together.

The batt or other filter medium to be used in air conditioners, in accordance with the present invention, is rendered sterile by depositing on or in the fibers of the filter an organo-metal compound, such as those referred to hereinbelow, which, while lethal to bacteria and fungi, is non-volatile in the atmosphere and does not render the air passing through the filter toxic to persons and animals as it is employed. This organo-metal compound and the bonding agent for the fibers, above mentioned, may be combined and applied to the filter medium in a single spraying operation. The treatment herein contemplated prolongs the effective filtering life of the filter medium by keeping it free of the effects of bacteria and fungi, and it decreases the likelihood of the filter medium throwing off objectionable odors or viable germs and spores caused by the presence of bacteria or fungi colonies growing in the filter media. This filter medium will also reduce smog by removing from the air the fine smoke particles and other foreign matter that are largely responsible for such smog. It will also remove air-borne pollen which produces allergy disturbances and other nasal discomforts.

The above and other features of the present invention will be further understood from the following description when read in connection with the accompanying drawing, wherein.

Figure 1:
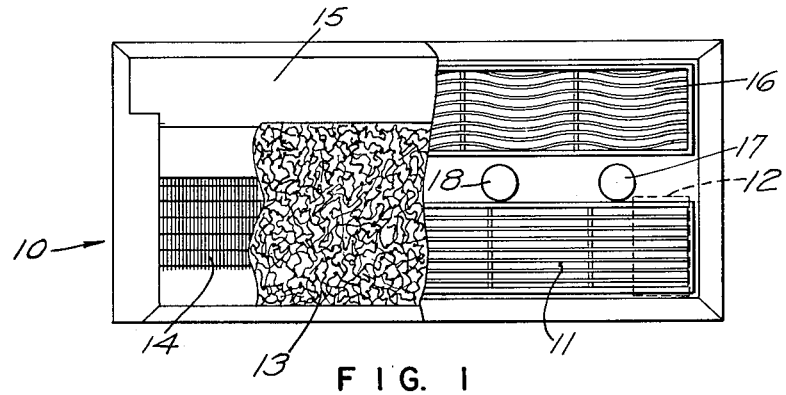
FIG. 1 is a front view of a window type air conditioner unit shown partly broken away, and equipped with a filter panel such as contemplated by the present invention.
Figure 2:
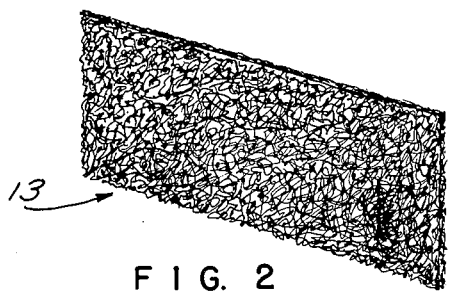
FIG. 2 is a perspective view of the filter panel shown in FIG. 1.
Figure 3:
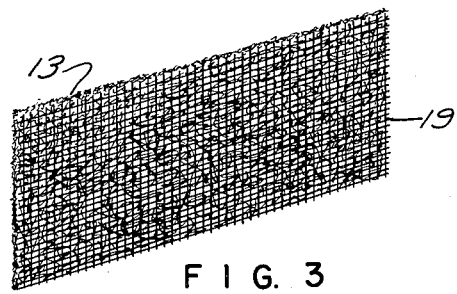
FIG. 3 is a view similar to FIG. 2 but showing a scrim sheet secured to a face of the filter panel.

The air conditioner unit shown in FIG. 1 of the drawing is or may be of well-known construction and is illustrated as one of many types of air conditioner units which may be provided with the chemically treated filter panel or batt of the present invention. This air conditioner is designated in its entirety by the numeral 10 and has the form of a rectangular box of sufficient depth to house the air conditioning mechanism. The box 10 has the air inlet grille 11 in the lower portion thereof through which air in the room to be cooled can enter. The box, preferably, has also the relatively small air inlet opening 12 through which air from outdoors may enter, and the size of this opening may be controlled by a door, not shown. Directly back of the opening 11 is provided the filter panel 13 which constitutes the subject matter of the present invention, and back of the panel 13 are disposed the cooling coils 14. Behind these coils is mounted an electric fan, not shown. Above the cooling coils 14 there is provided the air discharge opening 15 which is partly concealed at the front of the box by the grille 16.

The operation of this air conditioner unit is such that the air in the room to be air conditioned will enter the box through the opening 11 and will pass immediately through the filter panel 13. This air then passes through the cooling means 14 to the operating fan, and upon leaving this fan is discharged into the room through the opening 15 and grille 16. The operation of the unit may be controlled by the knobs 17 and 18. The construction of the filter unit is such that by removing the front grille 16 or the entire front panel, the filter medium 13 may be placed in its operating position in which it is shown in FIG. 1. It will operate in this position for months to filter the air passing therethrough and to destroy or render dormant the bacteria and fungi which lodge upon the fibers of the filter. This filter medium may serve also to free the air of an entire room of harmful fungi and bacteria, for as the air in the room is forced repeatedly through the filter medium, it will eventually be freed of dust, bacteria and fungi as long as the rate of contamination is less than the rate of removal by the filter. Also, this chemically treated filter medium will remain free of objectionable odors and will not become clogged with fungi or bacterial growths on the filter media.

The air conditioning batt or panel 13 may vary extensively in thickness and may be given any size desired to fit the air conditioner unit or other air conditioning apparatus in which it is to be used; and it is desired to point out that, while this panel is shown in FIG. 1 as used in air conditioner units for cooling a room, it is equally well adapted for use to filter the air that passes to the heating unit of a hot air furnace and to filter the air circulated by a ventilator or fan.

The panel 13 may be formed of various types of fibers which may be either natural or synthetic fibers, and they may vary extensively in length and diameter. The important thing is that they be so arranged in the filter medium that they will do a good filtering job without unduly restricting the passage of air therethrough. The essence of the present invention resides in such a filter medium that is treated with a non-volatile bactericide and fungicide that will retain these properties through many months of active use. The microbiocide may be sprayed or otherwise applied to the fibers or, in the case of synthetic fibers, it can be added to the fiber-forming compound or dope before the same is extruded to form the filaments.

Should it be desirable to add strength and increased stiffness to the panel 13, this may be done by securing to one face of the panel an open fabric or scrim sheet 19 that is lightweight, woven fabric in which the warp and weft threads are spaced a substantial distance apart so that the air can pass freely therethrough.

Figure 4:
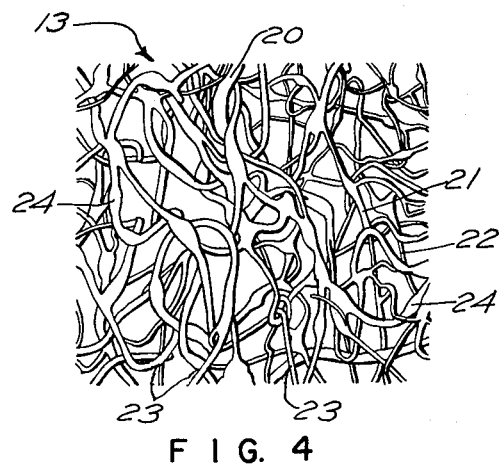
FIG. 4 is an enlarged drawing of a small area of one face of the panel of FIG. 2.

While, as above stated, the filter panel 13 may be formed of various fibers, it is found particularly desirable to use acetate or viscose fibers as they are relatively low in cost. These fibers preferably are crimped so that they will readily interlock one another, and the batt preferably is formed of three different sizes of fibers such as coarse fibers 20, intermediate fibers 21 and fine fibers 22, as shown in FIG. 4.

Since large quantities of air to be filtered will pass through the filter medium throughout its months of use and the flow of air through a filter batt tends to displace the fibers and form undesirable channels through the same, it is highly desirable to bond the fibers one to the other at their crossing point. The fiber batt may therefore be provided with a bonding agent which is applied to the batt in just sufficient quantity to bond the fibers to each other at their crossing point, as indicated by 23, without appreciably closing the interstices between the fibers. Such bonding agent is shown as forming the globules 24. The finished batt contains the organo-metal germicide to be described, and may contain also any one of a number of fire-retarding materials.

Figure 5:
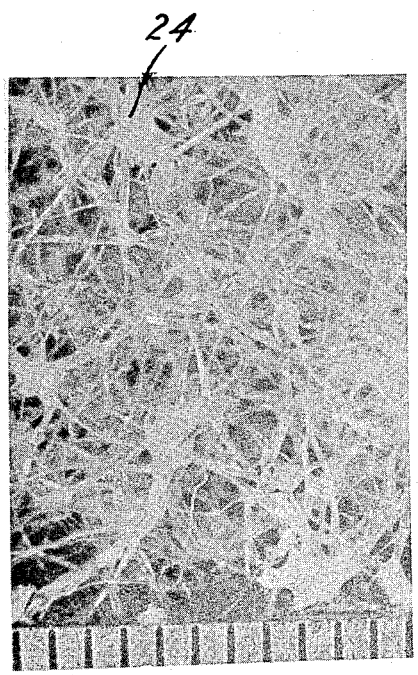
FIG. 5 is an enlarged photographic view of a face of a small portion of the panel of FIG. 2.

The photograph of FIG. 5 is an enlarged face view of one type of filter batt having the properties of the present invention. The scale at the bottom of this photograph has 1/64 of an inch graduations. The actual batt shown in this photograph was about 1/2-inch thick and was formed entirely of acetate fibers. It was made up of a blend of 75% 35 denier fibers, 10% 17 denier fibers and 15% 5.5 denier fibers. This batt contained about 25% by weight of the untreated batt of a bonding agent formed primarily of a polyvinyl acetate latex and 35% by weight of borax and boric acid in equal proportion. It also contained about 0.35% by weight of the finished batt of an organo-metal germicide in the dry state. The fibers vary in length from three inches down to a fraction of an inch.

While the specific construction of the batt shown in FIG. 5 is given above, it will be understood that every property and chemical composition of the filter medium contemplated by the present invention may be varied extensively. For example, the bonding globules 24 are of appreciable size in FIGS. 4 and 5, but it is possible to secure a good bond between the fibers with much smaller globules by using one of the bonding means above mentioned.

The batt of blended fibers shown in FIG. 4 may be formed by various fiber-handling means. If the batt is to be formed of synthetic fibers such as cellulose acetate fibers, then separate supplies of tows of crimped fibers, each of a different diameter and cut to the required staple lengths, are provided. The length of the staple for each fiber diameter is chosen on the basis of experience learned from the forming of experimental batts.

The baled fibers are opened and blended in a blending picker or by other textile machinery techniques. The blend is then fed to the batt-forming machine. The machine used can be an air laying machine such as the "Rando-Webber" made by the Curlator Corporation of Rochester, New York, or a cross laying garnet, a cross laying wool card line, or other fiber batt laying equipment may be used if modified to produce a batt having a randomly disposed fiber structure.

The batt is controlled by weight per unit area and loft. If to specification, the batt is carried through a spray bath of a water-carried dispersion of binder, fire retardant and germicide. If desired, the fire retardant can be omitted. The spray equipment is set for deep penetration. The sprayed batt then passes through an oven such as a bank of infrared lamps, or other suitable convection ovens. This oven process dries off the water and sets the binder, and fixes the germicide onto the fiber and binder surfaces. Sometimes it is necessary to spray one side of the batt first and then oven set the treatment, and then repeat on the opposite side.

In some filter applications it is desirable to impart added strength and stiffness to the filter batt. In such cases, a strengthening and stiffening scrim sheet, such as indicated by 19, may be adhered to the filter batt.

The binder spray dispersion may comprise a water emulsion of a suitable resin such as polyvinyl acetate, a soluble fire retardant such as sodium borate and boric acid, and a water emulsion of a germicide. Sometimes it is necessary to employ a wetting agent to keep the spray dispersion from settling out, but more especially to allow adequate penetration of the binder into the inner structure of the batt to accomplish full structural bonding of the filter media. Almost any commercially available wetting agent or surfactant may be used, such as, for example, the various nonionic, anionic, cationic and other known types. Resins such as urea formaldehyde, melamine resins such as melamine formaldehyde, rubber latex (hycar, natural, etc.), phenolic condensation products, polyvinyl chloride, polyvinyl acetate and others have been found satisfactory to obtain proper bonding of the fiber structure.

Various organo-metal compounds, employed in the present invention, have been found highly effective in imparting biocidal properties to the fiber surfaces of filter media in air conditioning units. Organo-tin compounds are preferred from the standpoints mentioned though desirable results may be obtained with organo-silver compounds.

Examples of organo-tin compounds found applicable in the present invention are tributyltin oxide, tributyltin chloride, tributyltin acetate, and others, preferably among those having a tetravalent tin atom to which are directly bonded a negative group or element, and three organic radicals. These may be compounded with a synthetic fiber substance employed in a filter or applied to the finished filter to provide the antibacterial and antifungal properties of the fibers in the filter to maintain the porosity of the filter over long periods of use in an air conditioner unit.

Examples of organo-silver compounds are silver thiocyanate and others including complexes such as those formed by mixing one molecular proportion of a silver salt such as silver chloride, nitrate, lactate and the like, with at least two molecular proportions of substantially anhydrous 1-hydroxy-2-amino-ethane or mono-butanol amine, or mono-propanol amine, forming a liquid product. Ethylenethiourea silver chloride complex is a further example.

The following examples illustrate methods of treating a filter fiber for use in an air conditioner unit, to maintain the porosity of a filter and to maintain fiber surfaces that prevent growth and multiplication of microorganisms in the spaces between fibers in the filter:

*Example 1.*—A fibrous panel material that serves to filter air in an air conditioner unit is impregnated or sprayed with a liquid-treating agent containing an organo-metal compound of the type referred to, preferably, an organo-tin compound. A solution or dispersion of tributyltin oxide, for example, of desired concentration, is applied to the fibrous material, and the treated material is allowed to dry. A treatment which results in obtaining panel material in which the tin compound is preferably uniformly distributed and in which the fiber contains the tin compound in the proportion of about 0.020% to about 0.35% by weight is found desirable. An example of an agent for applying the tin compound for this purpose is prepared with one part by weight of bis (tri-n-butyl tin) oxide, six parts by weight of polyethylene glycol monolaurate, or dialkyl dimethyl ammonium chloride in which at least one of the alkyls has a long carbon chain ($C_8$ to $C_{18}$), and about 500 parts by weight of water. An acid such as acetic, hydrochloric or salicylic and others may be used, if desired, in an amount sufficient to form a salt with the bis (tri-n-butyl tin) oxide.

*Example 2.*—A filter medium such as that described is contacted by spraying or immersion with a liquid including an organo-silver compound, with or without a binder and/or a surfactant. A satisfactory aqueous dispersion is one containing 470 parts per million of silver thiocyanate, and 1 percent by weight of resin emulsion consisting of about 50 percent of polyvinyl acetate as a binder, a small amount of surfactant such as an ammonium salt of sulfate ester of an alkyl phenoxy polyoxyethylene ethanol, and the remainder of water. The dispersion is permitted to dry on the surfaces of the fibers. A panel of a treated layer of fiber is inserted in an air conditioner unit.

The active agent applied as set forth above remains on the fiber in the filter after long use in an air conditioner and maintains sufficient strength to inhibit growth of fungi and bacteria which would otherwise obstruct the flow of air under the conditions of operating an air conditioner. Tests, including repeated washings with detergents and leaching for long periods, show that the fibers in treated filter media retain their bacteria-proofing, fungi-proofing and odor-proofing properties relatively permanently and that these properties are not readily removable.

Surfaces of the fibers in a filter treated as described are biocidal and inhibit the growth of various air-borne pestiferous organisms such as *M. aureus, E. coli, B. subtilis, T. gypseum, A. niger, C. globosum, M. verrucaria, P. pullulans,* and others, as they pass through the spaces between the fibers and upon contacting their surfaces at temperatures throughout the range at which air is filtered in an air conditioner as normally operated, thereby effectively preventing bridging across the spaces by bacteria and fungi which ordinarily seriously obstruct the flow of the air through the filter. In addition, it has been found that these microorganisms trapped by the filter are killed by the action of the chemical treatment described above.

Air filter media constructed, as above described, and treated with the described bactericidal and fungicidal chemicals will do a good job of removing dirt, dust, pollen and other foreign matter from the air passed therethrough and will inhibit the growth of bacteria and fungi on the filter for months of use. It will also free the air of a room of germs and fungi if such air is passed repeatedly through the filter media.

The filtering action of such media can be improved further by wetting the filter with oil so as to provide what is known as a "wet type" of filter rather than the "dry type" so far described. To this end a coarser fiber structure than that employed in a dry type filter batt is made in the same manner as above described. It is then sprayed with a non-volatile oil containing the same active ingredients of the germicide covered by this invention. If desired, the oil may be substituted by a synthetic oily substance, such as a polyglycol, like a polyethylene glycol fatty acid ester; a silicone, such as a methyl silicone polymer; and organic phosphate, such as tricresyl phosphate. Mineral oil is equally effective if fire retardancy is not required. The viscosity of the oil should be not less than 100 centistokes at the temperature the filter is used. The maximum viscosity is dependent upon the ease of application.

The fibers of the wet type filter should be sprayed until their surfaces are set, but not oversaturated. The function of the oil is one of increasing dirt removal filtration efficiency of the filter batt and still maintaining a satisfactory dirt loading capacity. This is accomplished by the strong attractive forces for particular matter at the interface of the oil on the fiber and the moving air stream.

The action of the germicide or fungicide for the oil-wetting filter is the same as that explained for the dry type filter medium. The microorganisms are picked up by the oil-wetted fibers and are killed by the biocidal action of the germicide in the oil or on the fibers of the filter media previously treated by the germicide or fungicide.

Having thus described the invention, what is claimed is:
1. An air filter comprising a fibrous filter medium having applied to its fibers a dry non-oleaginous permanent coating comprising (1) a surface-active wetting agent and (2) as a non-volatile bactericide and fungicide a com- pound selected from the class consisting of an organotin compound having a tetravalent tin atom which is bonded directly to at least one negative substituent and its remaining valences bonded directly to organic substituents and an organo-silver compound selected from the class consisting of a silver salt of an organic acid and an organic complex of a silver salt.

2. An air filter as defined by claim 1 wherein the non-volatile bactericide and fungicide compound is tributyltin oxide.

3. An air filter as defined by claim 1 wherein the non-volatile bactericide and fungicide compound is silver thiocyanate.

4. An air filter as defined by claim 1 wherein the surface-active wetting agent is a member selected from the class consisting of polyethylene glycol monolaurate, a dialkyl dimethyl ammonium chloride and an ammonium salt of a sulfate ester of an alkyl phenoxy polyoxyethylene ethanol.

5. An air filter comprising a fibrous filter media having applied to its fibers a dry non-oleaginous permanent coating comprising (1) as a surface-active wetting agent a dialkyl dimethyl ammonium chloride in which one of the alkyl groups shall contain from about 8 to 18 carbon atoms and (2) as a non-volatile bactericide and fungicide tributyltin oxide.

References Cited in the file of this patent

UNITED STATES PATENTS

| | | |
|---|---|---|
| 2,061,958 | Chapman | Nov. 24, 1936 |
| 2,087,436 | Kirby | July 20, 1937 |
| 2,178,614 | Slayter | Nov. 7, 1938 |
| 2,407,255 | Cupery | Sept. 10, 1946 |
| 2,562,488 | Fuchs | July 31, 1951 |
| 2,587,234 | Sebok et al. | Feb. 26, 1952 |

OTHER REFERENCES

Reddish: "Antiseptics, Disinfectants, Fungicides and Sterilization," 1954, Lea and Febiger, Phila., pp. 602 and 609.

Van Der Kerk et al.: Journal of Applied Chemistry, pp. 314, 319, June 4, 1954.

Mfg. Chemist, vol. 28, pp. 16–17, 1957.

Chem. Abstracts, vol. 52, p. 18990e, November 1958.